(12) United States Patent
Kalyanasundaram et al.

(10) Patent No.: US 11,788,637 B2
(45) Date of Patent: Oct. 17, 2023

(54) SYSTEMS AND METHODS FOR DETERMINING SET PRESSURE AND LIFT OF A SPRING-OPERATED RELIEF VALVE

(71) Applicant: Emerson Automation Solutions Final Control US LP, Houston, TX (US)

(72) Inventors: Vishwa Kalyanasundaram, Stafford, TX (US); Katherine Si, Stafford, TX (US); Joe Downing, Stafford, TX (US)

(73) Assignee: Emerson Automation Solutions Final Control US LP, Houston, TX (US)

( * ) Notice: Subject to any disclaimer, the term of this patent is extended or adjusted under 35 U.S.C. 154(b) by 309 days.

(21) Appl. No.: 17/180,106

(22) Filed: Feb. 19, 2021

(65) Prior Publication Data

US 2021/0262579 A1 Aug. 26, 2021

Related U.S. Application Data

(60) Provisional application No. 62/979,129, filed on Feb. 20, 2020.

(51) Int. Cl.
| | |
|---|---|
| *F16K 17/06* | (2006.01) |
| *F16K 17/04* | (2006.01) |
| *F16K 17/10* | (2006.01) |
| *F16K 37/00* | (2006.01) |
| *G01L 5/00* | (2006.01) |
| *G01M 3/00* | (2006.01) |

(52) U.S. Cl.
CPC .......... *F16K 17/06* (2013.01); *F16K 17/0426* (2013.01); *F16K 17/105* (2013.01); *F16K 37/0083* (2013.01); *G01L 5/0061* (2013.01); *G01M 3/00* (2013.01)

(58) Field of Classification Search
CPC ...................................................... F16K 17/06
USPC ............................................................ 73/1.72
See application file for complete search history.

(56) References Cited

U.S. PATENT DOCUMENTS

| | | | |
|---|---|---|---|
| 4,349,885 A | 9/1982 | Thompson | |
| 4,428,223 A | 1/1984 | Trevisan | |
| 4,761,999 A | 4/1988 | Thompson | |
| 5,275,036 A | 1/1994 | Schulz et al. | |
| 5,323,142 A | 6/1994 | Fain | |
| 2010/0236319 A1* | 9/2010 | Penman | F16K 37/0083 73/1.72 |

(Continued)

FOREIGN PATENT DOCUMENTS

| | | |
|---|---|---|
| CN | 103195957 B | 9/2014 |
| KR | 20170061975 A | 6/2017 |
| NO | 20190934 A1 * | 7/2020 ......... F16K 37/0091 |

OTHER PUBLICATIONS

"Crosby Style JOS-E, JBS-E, JLT-JBS-E, JLT-JOS-E Valves Installation and Maintenance Instructions." Emerson Electric Co. Published 2017. (Year: 2017).*

(Continued)

*Primary Examiner* — Walter L Lindsay, Jr.
*Assistant Examiner* — Philip T Fadul
(74) *Attorney, Agent, or Firm* — Quarles & Brady LLP

(57) ABSTRACT

A spring-operated relief valve can include an adjustable main spring to bias the valve closed and a load cell that is configured to measure a force exerted by the main spring. Measurements from the load cell can be used to determine a set or crack pressure in the spring-operated relief valve, and to monitor operation of the spring-operated relief valve.

17 Claims, 4 Drawing Sheets

(56) References Cited

U.S. PATENT DOCUMENTS

2015/0090003 A1 4/2015 Lee et al.

OTHER PUBLICATIONS

Emerson, Crosby J Series Presure Relief Valve Wtih Fisher™ 4320 Wireless Position Monitor, installation, operation and maintenance manual, Copyright 2019 Emerson, 9 pages.
Emerson, Crosby J-Series Direct Spring Pressure Relief Valves, catalog, Copyright 2017 Emerson, 92 pages.

* cited by examiner

SYSTEMS AND METHODS FOR DETERMINING SET PRESSURE AND LIFT OF A SPRING-OPERATED RELIEF VALVE

CROSS-REFERENCE TO RELATED APPLICATIONS

This application claims priority to U.S. provisional patent application No. 62/979,129, titled "Systems and Methods for Determining Set Pressure and Lift of a Spring-Operated Relief Valve" and filed on Feb. 20, 2020, the entirety of which is incorporated herein by reference.

BACKGROUND

Spring-operated pressure relief valves are used extensively in systems and vessels where pressure protection is required. For example, in such systems, excess pressure can lead to a process upset, instrument failure, or equipment failure. Pressure relief valves allow excess pressure to be relieved by allowing pressurized fluid to flow from an auxiliary passage out of the system.

SUMMARY

Some embodiments provide a spring-operated relief valve that includes a main spring, a pressure adjustment screw, and a disc assembly that is biased towards a valve seat by the main spring. A load cell can be configured to measure a force exerted by the main spring on the disc assembly, including to determine the crack pressure and the set pressure of the spring-operated relief valve. In one embodiment, the pressure adjustment screw may be threadably engaged with the load cell. In another embodiment, the load cell may be disposed between the pressure adjustment screw and an upper spring washer.

Some embodiments provide a method for setting a set or crack pressure for a spring-operated relief valve. The method can include pressurizing a valve inlet of the spring-operated relief valve and adjusting a bias of a main spring of the spring-operated relief valve. A load on the main spring can be determined at a select adjustment of the compression of the main spring. A valve-opening movement of the spring-operated relief valve can be identified based on the determined load.

Some embodiments provide a method for monitoring operation of a spring-operated relief valve. The method can include using a load cell to measure a force applied by a main spring of the spring-operated relief valve. A valve lift for the spring-operated relief valve can be determined based on the measured force, as may allow determination of total relieved capacity during a relief event (e.g., based on determination of a valve lift profile over time), or a set pressure of the spring-operated relief valve can be monitored.

Some embodiments provide a spring-operated relief valve. The spring-operated relief valve can include a valve housing, a valve seat, a disc assembly that is configured to seal against the valve seat to close the spring-operated relief valve, a main spring, and a load cell. The main spring can be arranged to bias the disc assembly towards the valve seat to define a set pressure of the spring-operated relief valve. The load cell, during operation of the spring-operated relief valve, can be in a fixed spatial relationship relative to the valve housing and in mechanical communication with the main spring, the load cell can be thereby configured to measure a force exerted by the main spring on the disc assembly as the disc assembly moves relative to the valve seat.

In some embodiments, a spring-operated relief valve can include a spindle that extends from a disc assembly to guide movement of the disc assembly relative to a valve seat. During operation of the spring-operated relief valve, the spindle is movable relative to a load cell to open and close the spring-operated relief valve relative to fluid flow across the valve seat.

In some embodiments, a spring-operated relief valve can include a spindle that extends through a load cell, to be movable through the load cell to open and close the spring-operated relief valve relative to fluid flow across a valve seat.

In some embodiments, a spring-operated relief valve can include a pressure adjustment member. A load cell can include internal threads and the pressure adjustment member is threadably received by the internal threads. The pressure adjustment member can be thereby threadably adjustable, relative to the load cell and a valve housing, to adjust a degree of compression of a main spring.

In some embodiments, a spring-operated relief valve can include a load cell. The load cell can be in mechanical communication with a main spring via a pressure adjustment member to measure a force exerted by the main spring on a disc assembly.

In some embodiments, a spring-operated relief valve can include a valve housing that includes a bonnet and a cap. A load cell can be retained between the bonnet and the cap.

In some embodiments, a spring-operated relief valve can include a first spring washer and a second spring washer. The first spring washer can be disposed opposite a main spring from a disc assembly. The second spring washer can be disposed opposite the main spring from the first spring washer, between the main spring and the disc assembly. A load cell can be in mechanical communication with the main spring via the first spring washer.

In some embodiments, a spring-operated relief valve can include a first spring washer and a second spring washer. The first spring washer can be disposed opposite a main spring from a disc assembly. The second spring washer can be disposed opposite the main spring from the first spring washer, between the main spring and the disc assembly. A load cell can be in mechanical communication with the main spring via the second spring washer.

In some embodiments, a spring-operated relief valve can include a load cell retained between a first spring washer and a pressure adjustment member that is threadably adjustable relative to a valve housing to adjust a degree of compression of the main spring.

In some embodiments, a spring-operated relief valve can include a load cell integrated with a first spring washer.

In some embodiments, a spring-operated relief valve can include a load cell. A force measured by the load cell can directly correspond to a force of fluid on a disc assembly, without reference to a measured pressure of the fluid.

In some embodiments, a spring-operated relief valve can include a load cell positioned exterior to a valve housing.

In some embodiments, a spring-operated relief valve can include a spindle that extends from a disc assembly to guide movement of the disc assembly relative to a valve seat. A pressure adjustment tube can receive the spindle and extends between a spring washer and a load cell to transmit force from a main spring to the load cell.

In some embodiments, a spring-operated relief valve can include a pressure adjustment member that is threadably adjustable relative to a load cell to adjust, via a pressure adjustment tube, a degree of compression of a main spring.

In some embodiments, a spring-operated relief valve can include a pressure adjustment member that is adjustable from outside of a valve housing.

Some embodiments provide a spring-operated relief valve that includes a valve housing, a valve seat, a disc assembly, a spindle, a main spring, and a load cell. The disc assembly can be configured to seal against the valve seat to close the spring-operated relief valve. The spindle can extend from the disc assembly to guide movement of the disc assembly relative to the valve seat. The main spring can be arranged to bias the disc assembly towards the valve seat to define a set pressure of the spring-operated relief valve. During the operation of the spring-operated relief valve, the load cell can be either immovably secured within the valve housing or immovably secured outside the valve housing. The load cell can be in mechanical communication with the main spring directly or via a rigid intervening component. The load cell can be thereby configured to measure a force exerted by the main spring on the disc assembly as the disc assembly and the spindle move relative to the valve seat and the load cell.

In some embodiments, a spring-operated relief valve can include a spindle and a load cell. During operation of the spring-operated relief valve, the spindle can be movable relative to the load cell to open and close the spring-operated relief valve relative to fluid flow across a valve seat. The load cell may not be in mechanical communication with a disc assembly via the spindle to measure the force exerted by a main spring.

Some embodiments provide a method of installing or calibrating a spring-operated relief valve. The method can include using a load cell to directly measure a force applied by a main spring of the spring-operated relief valve, the main spring being arranged to bias a disc assembly of the spring-operated relief valve toward a valve seat of the spring-operated relief valve to define a set pressure and a crack pressure of the spring-operated relief valve. The method can also include one or more of: determining a valve lift for the spring-operated relief valve based on the measured force, monitoring a current set pressure or crack pressure of the spring-operated relief valve based on the measured force, or setting a desired set pressure or crack pressure of the spring-operated relief valve by determining a target load on a main spring of the spring-operated relief valve, the target load corresponding to the desired set pressure or crack pressure and adjusting a bias of the main spring of the spring-operated relief valve until the force measured by the load cell corresponds to the target load.

In some embodiments, a method of installing or calibrating a spring-operated relief valve can include determining a total relieved capacity for a relief event based on a plurality of valve lifts that are identified based on a load cell measuring a plurality of forces applied by a main spring during the relief event.

In some embodiments, a method of installing or calibrating a spring-operated relief valve can include using a load cell to directly measure a force applied by a main spring of the spring-operated relief valve. The load cell can be fixedly secured relative to a valve housing of the spring-operated relief valve at one of outside of the valve housing of the spring-operated relief valve, between a pressure adjustment member and an upper spring washer of the spring-operated relief valve, or between a bonnet and a cap of the spring-operated relief valve.

In some embodiments, a method of installing or calibrating a spring-operated relief valve can include pressurizing a valve inlet of the spring-operated relief valve, adjusting the compression of a main spring among a plurality of compression loads, using a load cell to measure the compression load of the main spring at a select adjustment of the compression of the main spring, and identifying a valve-opening movement of the spring-operated relief valve that corresponds to the select adjustment of the compression of the main spring. Upon identifying the valve-opening movement, the method can also include determining a current set pressure or crack pressure based on the measured compression load.

Some embodiments provide a method for setting a set pressure or crack pressure for a spring-operated relief valve. The method can include pressurizing a valve inlet of the spring-operated relief valve, adjusting a compression of a main spring of the spring-operated relief valve among a plurality of compression loads, using a load cell to measure a compression load of the main spring at a select adjustment of the compression of the main spring, the load cell being in mechanical communication with the main spring and being spatially fixed relative to a valve body of the spring-operated relief valve during operation of the spring-operated relief valve, and identifying a valve-opening movement of the spring-operated relief valve that corresponds to the select adjustment of the compression of the main spring. Upon identifying the valve-opening movement, the method can include determining the set pressure or crack pressure based on the measured compression load.

In some embodiments, a method for setting a set pressure or crack pressure for a spring-operated relief valve can include using a load cell to measure a compression load of a main spring at a select adjustment of the compression of the main spring. A pressure adjustment member can be used to adjust the compression of the main spring and can be threadably engaged with the load cell.

In some embodiments, a method for setting a set pressure or crack pressure for a spring-operated relief valve can include using a load cell to measure a compression load of a main spring at a select adjustment of the compression of the main spring. The load cell can be disposed at one of: outside of the valve housing of the spring-operated relief valve, between a pressure adjustment member and an upper spring washer of the spring-operated relief valve, or between a bonnet and a cap of the spring-operated relief valve.

In some embodiments, a method for setting a set pressure or crack pressure for a spring-operated relief valve can include using a load cell during operation of the valve to measure a force applied by a main spring to a disc assembly of the spring-operated relief valve, and one or more of determining a valve lift for the spring-operated relief valve based on the measured force or monitoring a current set pressure or crack pressure of the spring-operated relief valve based on the measured force.

In some embodiments, a method for setting a set pressure or crack pressure for a spring-operated relief valve can include determining a total relieved capacity for a relief event that includes one or more valve lifts. The one or more valve lifts can be characterized based on a load cell measuring one or more corresponding forces applied by a main spring during a relief event.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
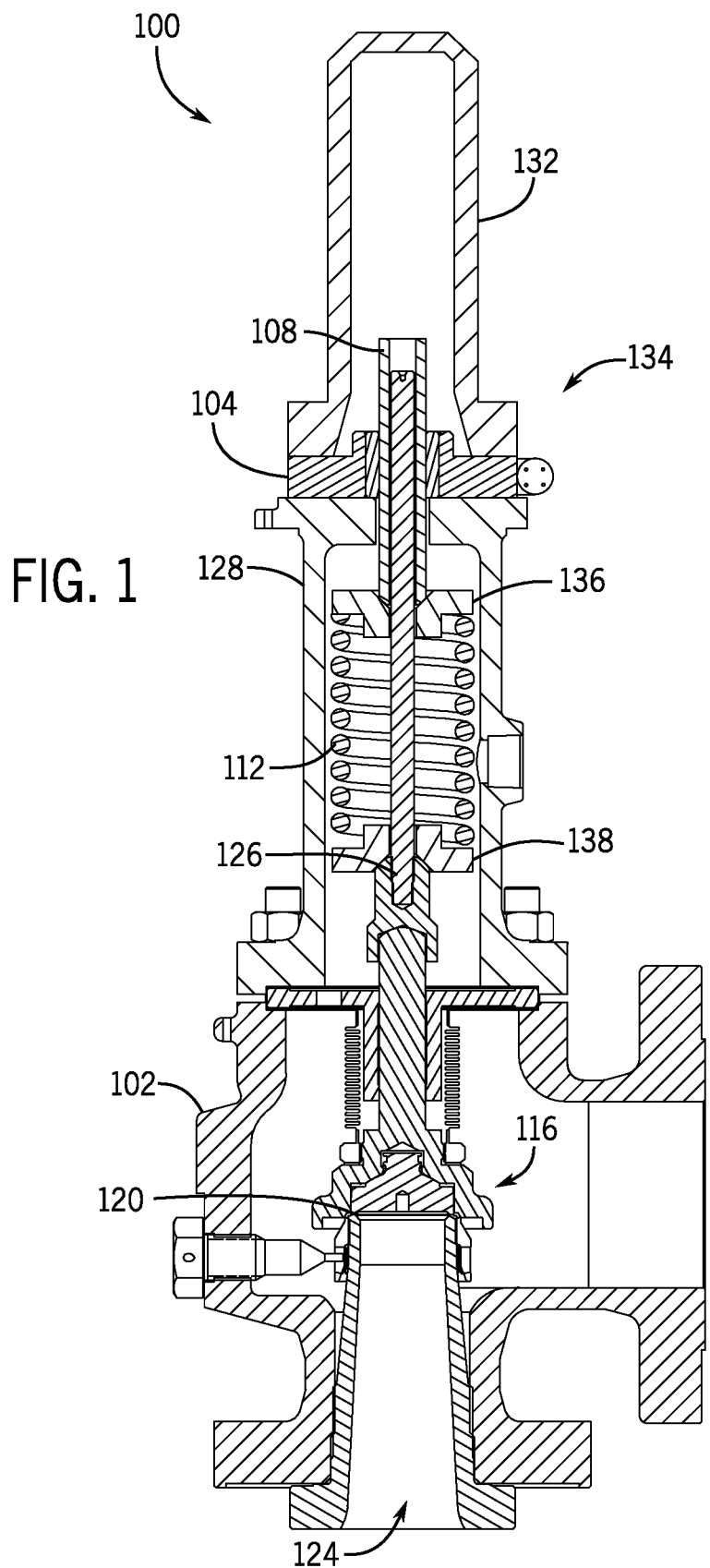
FIG. 1 is a cross-sectional view of a spring-operated pressure relief valve, including a load cell retained between a bonnet and a cap, according to an embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments or couplings.

As briefly discussed above, certain systems and vessels require pressure protection to avoid over-pressurization. Spring-operated pressure relief valves can be used in such systems to relieve and divert excess fluid pressure. In general, spring-operated pressure relief valves include a spring that is compressed by a predetermined value. The spring provides a force on a valve disc in a valve-closing direction (e.g., downward), thereby biasing the valve toward a closed position. The compression of the spring can be adjusted via a spring adjustment mechanism, such as an adjustable screw that controls the degree of compression of the spring for a given valve lift. When an opening (e.g., upward) force exerted by a pressurized fluid acting on the valve disc equals the closing (e.g., downward) force of the spring, plus any ancillary forces (e.g., due to the weight of a disc assembly), the valve begins to open. As the fluid pressure continues to increase, the spring is further compressed, and the valve is further opened.

Spring-operated pressure relief valves are generally configured to provide a set pressure, which is typically predetermined and preset before installation of the valves. The set pressure is typically a pressure at which the valve opens and there is a significant relief of system pressure, although other definitions are applied in different installations, as is known in the industry. In some instances, the set pressure may be defined as the pressure at which a first audible response (i.e., "pop") can be heard by a user, as a spring-operated pressure relief valve releases system pressure, or may be defined as the pressure at which leakage through a valve is first audible for human operators. As appropriate, the set pressure for a particular valve can be adjusted by varying the compression of a spring within the valve, including by adjusting a pressure adjustment screw to compress or release a spring by a certain amount.

In addition to a set pressure, spring-operated pressure relief valves further define a crack pressure. The crack pressure is a pressure at which the disc assembly of the valve first begins to lift from the valve seat in response to system pressure. In other words, the crack pressure may be defined as a pressure at which the force of the fluid on a line side of the valve seat equals the force exerted by the spring (and any ancillary forces) on a relief side of the valve seat. The effect of a system reaching crack pressure can be minute fluid leakage or a low decibel audible noise (e.g., such as may not necessarily be audible to human operators). In some cases, when a spring-operated pressure relief valve is at crack pressure, the valve disc may lift from the valve seat. However, due to the relatively small distances of travel, conventional lift measurement devices are often unable to detect such a movement until after greater pressure has been applied. In some systems, the set pressure value can be a small percentage (e.g., 3-5%) larger than a crack pressure value, such that a set pressure can be defined relative to a crack pressure (or vice versa), although other approaches are possible.

In general, valve lift can be defined as a distance between seating surfaces of a disc assembly (e.g., a disc insert thereof) and a nozzle in a spring-operated pressure relief valve, as the valve transitions between a closed and open position. The lift is said to be zero when the valve is in a closed position, and the lift reaches a maximum when the valve is in a fully opened position.

While the valve lift at crack pressure or at pressures only slightly above crack pressure is often undetectable using conventional lift measurement devices, some conventional systems can be used to help to determine or adjust set pressure or otherwise measure valve lift at higher pressures. For example, some conventional systems include force sensors to measure the total force required to move the internal moving parts of the valve, including a disc insert, a disc holder, a stem, etc., in combination with pressure sensors, position sensors, movable diaphragms or air bellows to define air-tight chambers, controllers that can control air pressure within those chambers (see, e.g., U.S. Pat. Nos. 4,761,999 and 4,349,885, both of which are incorporated herein by reference), and other components. Such systems can require complex arrangements and control, and precise positioning of sensors to accurately measure force. Other conventional systems for determining and adjusting a set pressure include the use of a position transmitter and magnets that require attachment to moving parts. Such arrangements can be complicated and expensive to produce due to the involvement of multiple components encased in the position transmitter itself. As another example, some conventional approaches determine set pressure based on identification of auditory signals (e.g., a first "pop") by a human operator, as the compression of a spring for a valve is manually adjusted.

Embodiments of the disclosed invention can improve on these approaches and others, including by utilizing load measuring devices to determine loading of a biasing spring of a spring-operated pressure relief valve and to thereby determine valve lift, total relieved capacity for a relief event, and other related factors. For example, a force transducer can be used to determine valve lift of a spring-operated pressure relief valve by measuring the force exerted by (and on) the main spring of the valve at any given time. Based on this measurement, the distance by which the spring has been compressed can then be readily calculated. For example, Hooke's law states that the force (F) needed to extend or compress a spring by some distance (x) scales linearly with respect to that distance by the factor of a spring rate (k): i.e., F=k·x. Thus, if a spring rate for a given spring is known, along with the force applied by (or to) the spring, the distance by which the system has been compressed or extended can be readily determined.

In this regard, a spring rate is generally a characteristic of a given spring, and can be readily determined in a variety of known ways. Further, a spring rate is generally constant, particularly outside of extreme ends of the possible range of extension or compression of a given spring. However, in some cases, a spring rate can be non-constant, varying based on temperature or other factors, particularly for relatively large temperature changes.

In some embodiments of the disclosed invention, a load measuring device is attached or integrated into a spring-operated pressure relief valve that includes a main spring to bias a disc assembly of the valve toward a valve seat on a nozzle of the valve (i.e., to bias the valve closed). The load measuring device can be configured as a load cell of a variety of known types (or in other ways), and can be configured to measure the load exerted by the main spring on the disc assembly. The degree of compression of the main spring and, thereby, the lift of the valve may then be determined based on the measured load, in combination with other known parameters of the spring-operated pressure relief valve, as appropriate, including the spring rate of the main spring, the area of the disc assembly that is exposed to line pressure, or the weight of relevant moving parts (e.g., of a valve spindle and the disc assembly). Correspondingly, whether a system is currently at (or above) a set pressure or a crack pressure can also be determined, even when such system pressures may result in relatively small valve lift. Further, such an arrangement can allow continuous monitoring over time of the state of the valve (e.g., open, closed, or at an intermediate position) and of actual valve lift, which can in turn be used to determine other factors, including estimates of the total fluid that has been relieved by the spring-operated pressure relief valve.

In some embodiments, a load measuring device that is configured to determine force on a spring of a spring-operated relief valve can allow for an automated or semi-automated setting of the set pressure of the spring-operated relief valve. For example, before installation in an industrial setting, a valve inlet of a spring-operated relief valve may be pressurized to a desired set pressure (or other pressure value). A pressure adjustment screw may then be used to adjust the compression of a main spring of the valve, with the load cell measuring a current spring force of the main spring for any given orientation of the adjustment screw (e.g., measuring such force continually at a particular sample rate). As generally discussed above, this spring force can then be converted (e.g., by a local or remote processor device) into a displacement value for the main spring and, correspondingly, into a valve lift value for the valve.

Accordingly, by measuring the current spring force, a current valve lift can be determined that corresponds to the current valve inlet pressure and the current orientation of the pressure adjustment screw. Further, an orientation of the pressure adjustment screw associated with a desired lift of the valve, for a given valve inlet pressure, can also be similarly determined based on measurements by the load cell. This, in turn, can allow the valve to be configured to provide the desired set pressure during operation without necessarily relying on detection of auditory signals (e.g., a first "pop") and without requiring more complex (e.g., diaphragm-based) measurement systems.

In some embodiments, a load cell can transmit the measured load to a separate controller as an electronic signal, such as may allow further processing at or remotely from a relevant valve assembly. In some embodiments, the electronic signal may be received by a device with a digital display, such as, for example, a computer monitor, such as may allow display of alerts, alarms, or other information.

In some embodiments, it may be useful to arrange a load cell to be in a fixed spatial relationship relative to a body of a spring-operated pressure relief valve during operation of the valve. For example, a load cell can be configured to be adjustably positioned before operation of a spring-operated pressure relief valve, relative to a valve body, bonnet, and cap of the valve, but can then be fixed against movement relative to the valve body, bonnet, and cap during operation of the valve. In this way, for example, a load from a main spring of the spring-operated pressure relief valve can be measured without necessarily requiring complex structural arrangements such as additional springs, diaphragms, linkage, and so on.

For similar reasons, it may also be useful to arrange a load cell to measure a force exerted by a main spring of a spring-operated pressure relief valve directly (i.e., via contact with the main spring) or via a rigid intervening component. For example, a load cell can be configured to measure a force exerted by a main spring via a rigid intervening component that is urged toward the load cell by the main spring (e.g., a spring washer or rigid adjustment screw), so that complex intervening structures or supporting measurements (e.g., of system pressure) are not necessarily required as part of determining the force applied by the main spring (or determining a valve lift) based on a force measured by the load cell. In this regard, for example, a load cell in some configurations may not measure aspects of operation of a main spring by way of forces applied to the load cell via a spindle of the relevant valve. Similarly, as another example, a load cell in some configurations may be arranged to provide a mechanical connection between a main spring and a body of a spring-operated relief valve, such that the main spring presses against the body, via the load cell, in order to apply spring force against the disc assembly of the valve.

Referring now to FIG. 1, a spring-operated pressure relief valve 100 according to one embodiment of the invention is shown. In the illustrated embodiment, the spring-operated relief valve 100 includes a valve body 102 and a single load cell 104. The relief valve 100 further includes a pressure adjustment member configured as a pressure adjustment screw 108 that is engaged with a main spring 112. The main spring 112 is configured to bias a disc assembly 116 towards a valve seat 120 at an inlet nozzle 124. The main spring 112 biases the disc assembly 116 toward the valve seat 120 to define a set pressure of the spring-operated relief valve 100. A spindle 126 extends from the disc assembly 116 to guide movement of the disc assembly 116 relative to the valve seat 120. The relief valve 100 further includes a bonnet 128 that acts as a cover to the valve body 102 and a cap 132 that covers the pressure adjustment screw 108 at one end of the bonnet 128. In general, the bonnet 128 and the cap 132 form a valve housing 134 of the valve 100.

As shown in FIG. 1, the load cell 104 is secured to the relief valve 100 in order to measure the axial force applied to the pressure adjustment screw 108 by the main spring 112 (via an intervening upper spring washer 136). In the embodiment shown, in particular, the load cell 104 includes internal threads that are dimensioned to receive and threadably engage the pressure adjustment screw 108 so that the pressure adjustment screw 108 can be adjusted relative to the load cell 104 and the housing 134 to adjust a degree of compression of the main spring 112.

With continued reference to FIG. 1, in the illustrated embodiment, the load cell 104 is retained between the bonnet 128 and the cap 132 so that the load cell 104 is immovable (i.e., has an unchanging fixed spatial relationship) relative to the housing 134, and the spindle 126 is movable relative to the load cell 104. In particular, in the illustrated embodiment, the spindle 126 is configured to move through the load cell 104 to open and close the spring-operated relief valve 100. Further, the pressure adjustment screw 108 (i.e., as a rigid body) is configured to transmit axial forces from the main spring 112 (and the spring washer 136), to the bonnet 128 and cap 132, only via the load cell 104. Thus, in the illustrated embodiment and as further discussed below, the load cell 104 is arranged to directly measure, via an equal and opposite reaction force, effectively the entirety of the force exerted by the main spring 112 on the disc assembly 116 (minus incidental frictional losses from the various moving components). In other embodiments, however, including as discussed below, a load cell can be otherwise disposed, including with one or more additional (or alternative) intervening rigid components. Further, any variety of types of load cells can be used, depending on the particular context and desired sensing range.

In use, the main spring 112 applies equal and opposite forces to upper and lower spring washers 136, 138 to bias the disc assembly 116, relative to the bonnet 128, toward the closed orientation (as shown). In general, the upper spring washer 136 is disposed opposite the main spring 112 from the disc assembly 116 and the lower spring washer 138 is disposed opposite the main spring 112 from the upper spring washer 136. Each of the upper and lower spring washers 136, 138 generally provides a spring seat which the main spring 112 can bear against.

Because the load cell 104 secures the upper spring washer 136 relative to the bonnet 128, via the intervening pressure adjustment screw 108, the force from the main spring 112 at the upper spring washer 136 can be determined by the load cell 104. Namely, the load cell 104 is in mechanical communication with the main spring 112 so that the load cell 104 can measure a force exerted by the main spring 112 on the disc assembly 116 as the disc assembly 116 and the spindle 126 move relative to the valve seat 120 and the load cell 104 (e.g., to open the valve 100 relative to flow across the valve seat 120). Correspondingly, in the illustrated embodiment, the load cell 104 is not in mechanical communication with the disc assembly 116 via the spindle 126 to measure the force exerted by the main spring 112. Thus, as generally discussed above, the degree of compression of the main spring 112 can be readily determined based on force measurements at the load cell 104, as can, correspondingly, the displacement of the disc assembly 116 relative to a reference position (e.g., fully closed) without reference to a measured pressure of the fluid.

During setup operations (e.g., an initial configuration) for the relief valve 100 of FIG. 1, as the pressure adjustment screw 108 is adjusted in opposing directions, the compression of the main spring 112 increases or decreases, respectively, which correspondingly increases or decreases the crack pressure and the set pressure of the relief valve 100. For a desired set (or crack) pressure and valve size, the required load value on the main spring 112 can be computed and the pressure adjustment screw 108 can then be adjusted until this load—and the desired set (or crack) pressure—is achieved, as indicated by the load cell 104. Or, as also discussed above, the inlet 124 of the relief valve 100 can be pressurized at a desired set (or other) pressure, and the measurements by the load cell 104 can be used, in combination with other known factors for the valve 100, to identify valve lift and thereby determine a particular setting of the pressure adjustment screw 108 at which an appropriate opening of the valve 100 results (e.g., as corresponds to crack pressure or set pressure). For example, the mathematical product of the applied pressure and a relevant area of the disc assembly 116 can indicate an opening force on the disc assembly 116 by the applied pressure. Under known principles, and in combination with the change in load measured by the load cell due to application of the applied pressure, that force can then be used to derive the distance by which the disc assembly 116 has lifted (i.e., the valve lift).

Similarly, during operation, when the disc assembly 116 is lifted from the valve seat 120 by system pressure, the valve lift (L) can be calculated as a function of a current load cell reading ($LC_c$), an initial load cell reading ($LC_0$), and the spring rate (k) (e.g., as $L=((LC_c-LC_0)/k)$. In some cases, the occurrence and extent of a relief (or other) event can then be determined accordingly.

Figure 2:
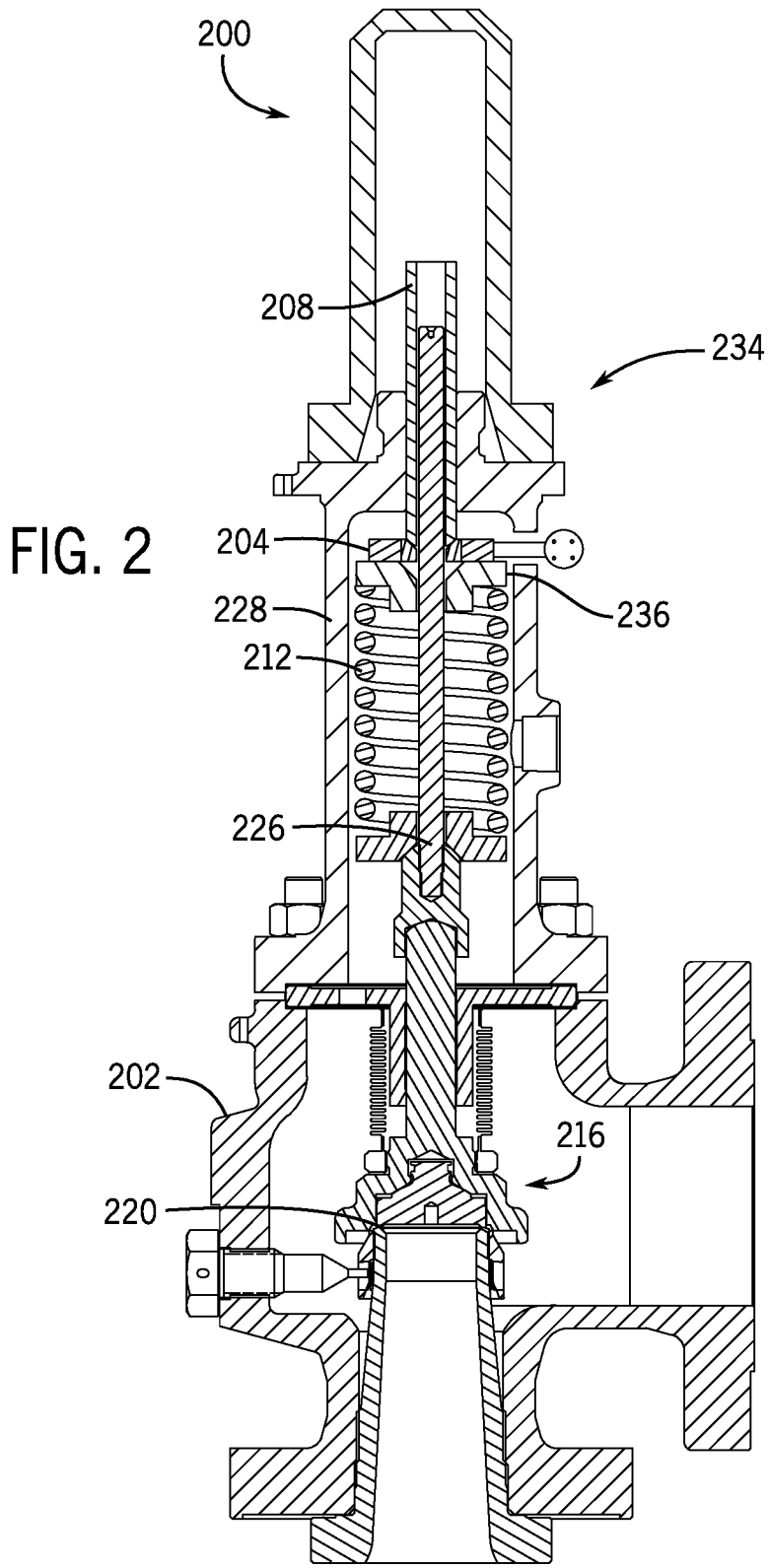
FIG. 2 is a cross-sectional view of a spring-operated pressure relief valve, including a load cell positioned between a pressure adjustment member and a spring washer, according to another embodiment of the invention.

In different embodiments, load cells can be arranged in a variety of ways in order to appropriately measure the force on a main spring of a valve, including as may embody similar principles as discussed relative to FIG. 1, above. In this regard, for example, FIG. 2 illustrates a spring-operated relief valve 200 that includes a valve body 202 and various other similar components to the valve 100 (which operate similarly). In the embodiment illustrated in FIG. 2, a load cell 204 is disposed between an upper spring 236 washer and a pressure adjustment screw 208. Similar to the load cell 104 shown in FIG. 1, the load cell 204 as shown in FIG. 2 can measure the force exerted by a main spring 212 against the upper spring washer 236, as corresponds to the force exerted by the main spring 212 to bias a disc assembly 216 toward a valve seat 220. Thus, as similarly described above, measurements from the load cell 204 can be used to identify crack or set pressures, to quantify flow for relief events, or to otherwise monitor the valve 200.

Generally similarly to the load cell 104, during operation of the valve to sense and relieve pressure, the load cell 204 is immovably secured to the valve 100 relative to a valve housing 234. In particular, the load cell 204 is secured within the valve housing 234 and is in mechanical communication with the main spring 212 via the upper spring washer 236. Further, in the illustrated embodiment, the pressure adjustment screw 208 is in threaded engagement with a bonnet 228 of the housing 234, and receives a spindle 226 that extends from the disc assembly 216. The spindle 226 can also extend through the load cell 204 to be moveable through the load cell 204 to open and close the spring-operated relief valve 200 (i.e., the spindle 226 is not in mechanical communication with the load cell 204 so as to transmit force from the main spring 212 to the load cell 204).

With the illustrated arrangement, therefore, like the valve 100, the pressure adjustment screw 208 of the valve 200 can be adjusted to set the set pressure or crack pressure of the valve 200. However, differently from the valve 100, as the pressure adjustment screw 208 is moved relative to the housing 234, the load cell 204 can also be moved relative to the housing 234 to set the set pressure (i.e., adjust the degree of compression of the main spring 212). Thus, the load cell 204 is not absolutely immovable relative to the housing 234. However, because the pressure adjustment screw 208 is generally fixed against movement during operation of the valve 200 to sense and relieve system pressure, and the load cell 204 is mechanically secured relative to the housing 234 by the adjustment screw 208, the load cell 204 will generally be immovable relative to the housing 234 during operation of the valve 200 (as also noted above).

In some embodiments, a load cell can be integrated into other components of a spring-operated relief valve. For example, in a configuration similar to that shown in FIG. 2, a load cell may be integrated with a spring washer for a main spring of a spring-operated relief valve. In general, a load cell may be disposed at any location where the axial spring load can be measured, including on or in an upper or lower spring washer, or at any variety of locations that are appropriately connected to a main spring such that the spring force on the disc assembly may be measured.

For example, in some embodiments, a load cell can be disposed between a lower spring washer and a disc assembly of a spring-operated relief valve. As described above, upper and lower spring washers provide respective spring seats against which the main spring can bear against. As a result, the main spring applies equal and opposite forces on each of the spring washers. Therefore, in an embodiment where the load cell is disposed between the lower spring washer and the disc assembly, the load cell can directly measure a force exerted on the main spring of the relief valve, similar to the embodiments described with reference to FIGS. 1 and 2. However, configurations in which a load cell is immovably fixed relative to a housing to directly measure a force applied by a main spring may be particularly beneficial, including for reasons discussed above.

Figure 3:
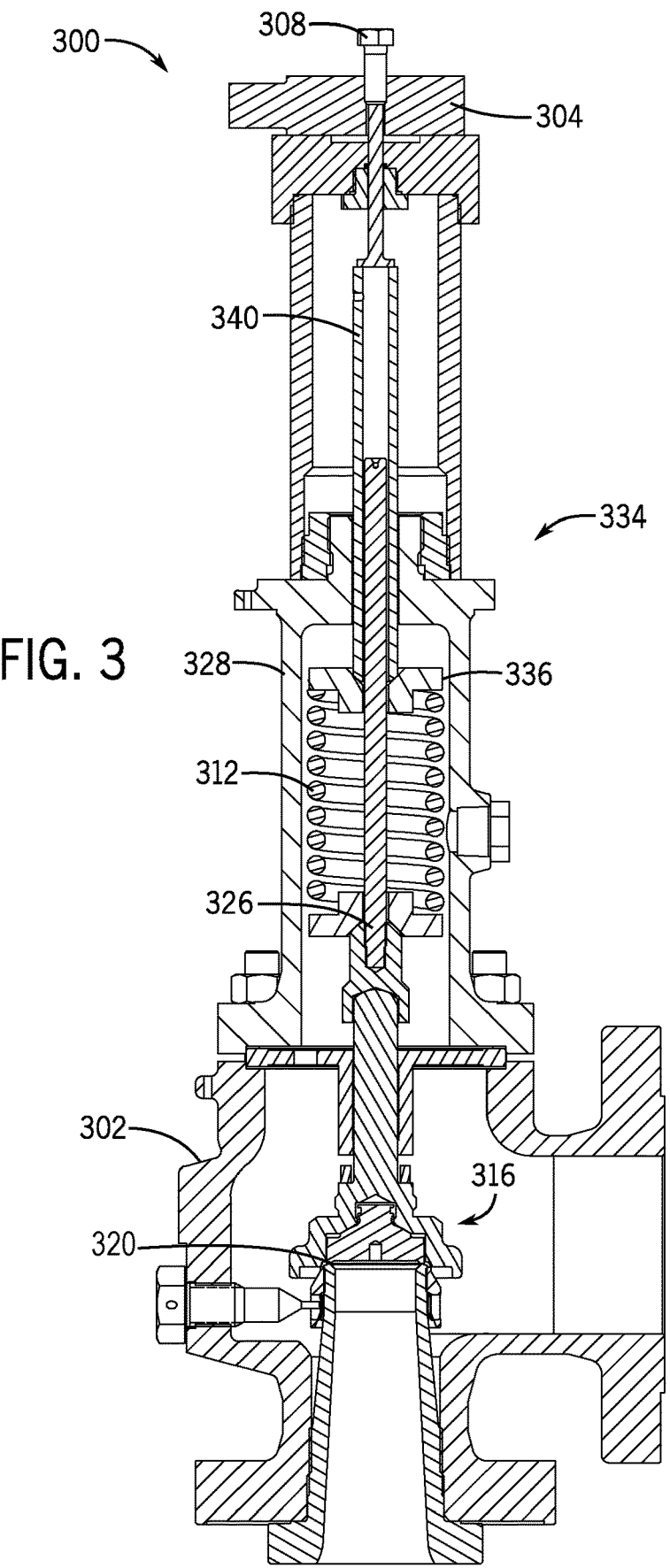
FIG. 3 is a cross-sectional view of a spring-operated pressure relief valve, including a load cell secured outside a valve housing, according to yet another embodiment of the invention.

In another embodiment, as shown in FIG. 3, a valve 300 can include a valve body 302 and a valve housing 334. In the illustrated configuration, the valve 300 also includes a load cell 304 that is immovably fixed relative to the valve housing 334, to the outside of a bonnet 328 (and the housing 334 in general). Similar to the embodiment illustrated in FIG. 1, the load cell 304 in the embodiment of FIG. 3 includes a threaded hole extending therethrough that is dimensioned to receive a threaded pressure adjustment screw 308. The threaded pressure adjustment screw 308 engages a rigid unthreaded pressure adjustment tube 340, which is configured to compress a main spring 312 of the valve 300 by adjustable amounts, corresponding to different positions of the adjustment screw 308.

Like the valves 100, 200, the valve 300 includes a spindle 326 that extends from a disc assembly 316 to guide movement of the disc assembly 316 relative to a valve seat 320. The spindle 326 extends into pressure adjustment tube 340 while remaining mechanically untied from the load cell 304 (e.g., similarly to the spindles 126, 226 relative to the load cells 104, 204). Thus, in the illustrated embodiment, the load cell 304 is mechanically coupled to the main spring 312, for direct measurement of the force applied by the main spring 312, via the pressure adjustment tube 340 that extends between the load cell 304 and an upper spring washer 336. However, other arrangements are possible in other embodiments, including with additional (or alternative) rigid intervening components.

Thus, the load cell 304 can measure the axial load imparted on the pressure adjustment screw 308 by the main spring 312, as transmitted via the upper spring washer 336 and the pressure adjustment tube 340. In particular, as may help to allow the illustrated simplicity of the arrangement and associated monitoring of the valve 300, the load cell 304 is not in mechanical communication with the main spring 312 via the disc assembly 316 of the valve 300 or the spindle 326, to measure force on the main spring 312. Relatedly, the force measured by the load cell 304 directly corresponds to a force of fluid on the disc assembly 316 (or, more generally, to the force applied by the main spring 312 to the disc assembly 316, including when the system is below set or crack pressure), without necessarily requiring the sensing of other reference pressures or forces (e.g., a measured pressure of the fluid). Similar to the arrangements illustrated in FIGS. 1 and 2, measurements by the load cell 304 can be used in order to determine an appropriate setting of the pressure adjustment tube 340, such as to initially configure the valve 300 for a particular set or crack pressure, and can be used to monitor lift of the valve during operation, including at crack pressure (and otherwise).

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Figure 4:
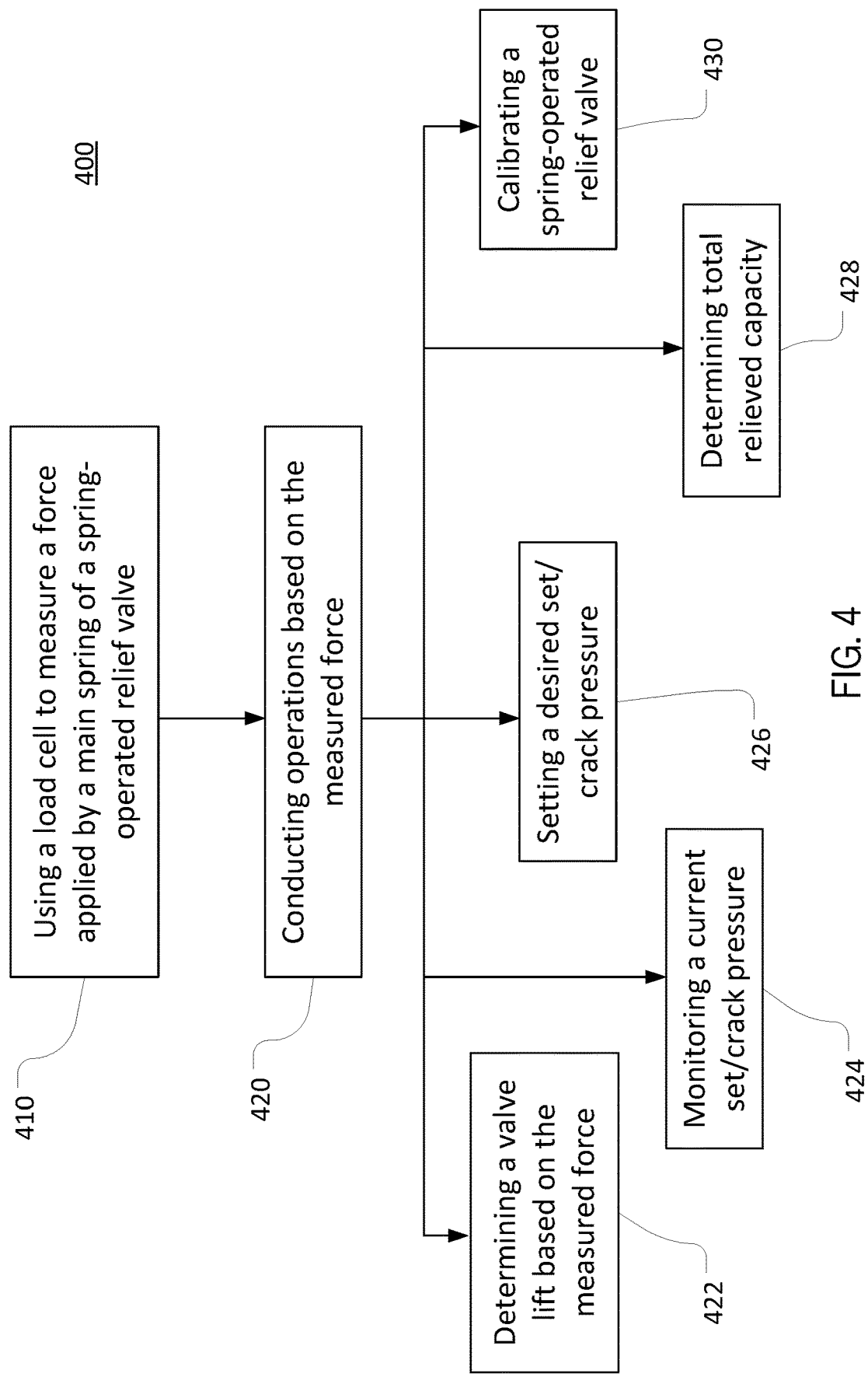
FIG. 4 is a schematic diagram of a method of installing or calibrating a spring-operated relief valve, according to an embodiment of the invention.

In this regard, for example, FIG. 4 illustrates an example method that can be implemented relative to various spring-operated relief valves disclosed herein, and associated control systems. In the discussion below, reference may be made in particular to only a select one or more of the spring-operated relief valves 100, 200, 300. However, the methods disclosed herein can generally be implemented relative to any of these (or other) valves according to the disclosure.

In particular, FIG. 4 illustrates a method 400 that includes using 410 a load cell (e.g., the load cell 104) to directly measure a force applied by a main spring of a spring-operated relief valve (e.g., the main spring 112). Based on data from the load cell measurement, the method 400 can further include conducting 420 one or more of various additional calibrating, monitoring, or other operations. For example, the method 400 can include determining 422 a valve lift for the spring-operated relief valve based on the measured force or monitoring 424 a current set pressure or crack pressure of the spring-operated relief valve based on the measured force. In this regard, for example, a valve lift can be determined 422 or a crack or set pressure can be monitored 424 in various ways, including as discussed above: e.g., determining valve lift based on measured force and a spring constant of the corresponding main spring, or determining a current set pressure based on equating pressure force on a disc assembly (e.g., the disc assembly 116) with spring force as measured by a load cell. In particular, in some cases, a change in load sensed by a load cell that directly measures a force applied by the main spring of a relief valve can indicate movement of a disc assembly from a valve seat because the force acting on the main spring generally remains stagnant until a set pressure is reached.

In some implementations, the conducted 420 operations can include setting 426 a desired set pressure or crack pressure of the spring-operated relief valve. For example, a target load on a main spring of the spring-operated relief valve can be determined, as may corresponding to the desired set pressure or crack pressure. Then, a bias of a main spring (e.g., the main spring 112) can be adjusted until the force measured by the load cell corresponds to the target load.

In some implementations, the conducted 420 operations can include determining 428 a total relieved capacity for a relief event based on a plurality of valve lifts that are identified based on the load cell measuring a plurality of forces applied by the main spring during the relief event. For example, a numerical integration of valve lifts and flow rates that correspond to the valve lifts can be completed for a relief event, with the resulting sum of flow over time providing an indication of the total relieved capacity for the relief event.

In some implementations, the conducted 420 operations can include calibrating 430 a spring-operated pressure relief valve. For example, calibrating 430 a spring-operated relief valve can include pressurizing a valve inlet (e.g., the inlet nozzle 124) of the spring-operated relief valve. The compression of a main spring (e.g., the main spring 112) of the spring-operated relief valve can then be adjusted among one or more compression loads (e.g., sequentially over a predetermined range) and the load cell can be used to measure the compression load of the main spring at one or more of the adjustments of the compression of the main spring. Based on the load cell measurements, a current set pressure or crack pressure can then be identified. For example, a current set or crack pressure can be identified directly from a pressure reading at the valve inlet upon the load cell measurement indicating appropriate valve lift. As another example, a current set or crack pressure can be identified indirectly by solving a force balance equation between the force measured by a load cell and the pressure force applied to the relevant disc assembly when the load cell indicates the appropriate valve lift.

Thus, embodiments of the disclosed invention can provide an improvement over conventional arrangements for setting a set pressure of a spring-operated relief valve, detecting crack or set pressure of the valve, or otherwise monitoring the valve during operation. The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

The invention claimed is:

1. A spring-operated relief valve comprising:
    a valve housing
    a valve seat;
    a disc assembly configured to seal against the valve seat to close the spring-operated relief valve;
    a main spring arranged to bias the disc assembly towards the valve seat to define a set pressure of the spring-operated relief valve;
    a load cell that, during operation of the spring-operated relief valve, is in a fixed spatial relationship relative the valve housing and in mechanical communication with the main spring, the load cell being thereby configured to measure a force exerted by the main spring on the disc assembly as the disc assembly moves relative to the valve seat; and
    a pressure adjustment member,
    wherein the load cell includes internal threads and the pressure adjustment member is threadably received by the internal threads, the pressure adjustment member being thereby threadably adjustable, relative to the load cell and the valve housing, to adjust a degree of compression of the main spring.

2. The spring-operated relief valve of claim 1, further comprising:
    a spindle that extends from the disc assembly to guide movement of the disc assembly relative to the valve seat;
    wherein, during operation of the spring-operated relief valve, the spindle is movable relative to the load cell to open and close the spring-operated relief valve relative to fluid flow across the valve seat.

3. The spring-operated relief valve of claim 2, wherein the spindle extends through the load cell, to be movable through the load cell to open and close the spring-operated relief valve relative to fluid flow across the valve seat.

4. The spring-operated relief valve of claim 1, wherein the load cell is in mechanical communication with the main spring via the pressure adjustment member to measure the force exerted by the main spring on the disc assembly.

5. The spring-operated relief valve of claim 4, wherein the valve housing includes a bonnet and a cap; and
    wherein the load cell is retained between the bonnet and the cap.

6. The spring-operated relief valve of claim 1 further comprising:
    a first spring washer disposed opposite the main spring from the disc assembly; and
    a second spring washer disposed opposite the main spring from the first spring washer, between the main spring and the disc assembly; and
    wherein the load cell is in mechanical communication with the main spring via the first spring washer.

7. The spring-operated relief valve of claim 6, wherein the load cell is retained between the first spring washer and a pressure adjustment member that is threadably adjustable relative to the valve housing to adjust a degree of compression of the main spring.

8. The spring-operated relief valve of claim 6, wherein the load cell is integrated with the first spring washer.

9. The spring-operated relief valve of claim 1, wherein the force measured by the load cell directly corresponds to a force of fluid on the disc assembly, without reference to a measured pressure of fluid at an inlet of the spring-operated relief valve.

10. The spring-operated relief valve of claim 1, wherein the load cell is positioned exterior to the valve housing.

11. The spring-operated relief valve of claim 10, further comprising:
    a spindle that extends from the disc assembly to guide movement of the disc assembly relative to the valve seat; and
    a pressure adjustment tube that receives the spindle and extends between a spring washer and the load cell to transmit force from the main spring to the load cell.

12. The spring-operated relief valve of claim 11, further comprising:
    a pressure adjustment member that is threadably adjustable relative to the load cell to adjust, via the pressure adjustment tube, a degree of compression of the main spring.

13. The spring-operated relief valve of claim 12, wherein the pressure adjustment member is adjustable from outside of the valve housing.

14. A spring-operated relief valve comprising:
    a valve housing;
    a valve seat;
    a disc assembly configured to seal against the valve seat to close the spring-operated relief valve;
    a spindle that extends from the disc assembly to guide movement of the disc assembly relative to the valve seat;
    a main spring arranged to bias the disc assembly towards the valve seat to define a set pressure of the spring-operated relief valve; and
    a load cell that, during operation of the spring-operated relief valve, is one of immovably secured within the valve housing or immovably secured outside the valve housing;
    wherein the load cell is in mechanical communication with the main spring directly or via a rigid intervening component, the load cell being thereby configured to measure a force exerted by the main spring on the disc assembly as the disc assembly and the spindle move relative to the valve seat and the load cell, and
    wherein, during operation of the spring-operated relief valve, the spindle is movable relative to the load cell to open and close the spring-operated relief valve relative to fluid flow across the valve seat and the load cell is not in mechanical communication with the disc assembly via the spindle to measure the force exerted by the main spring.

15. A method of installing or calibrating a spring-operated relief valve, the method comprising:
    using a load cell to directly measure a force applied by a main spring of the spring-operated relief valve, the main spring being arranged to bias a disc assembly of the spring-operated relief valve towards a valve seat of the spring-operated relief valve to define a set pressure and a crack pressure of the spring-operated relief valve;
    pressurizing a valve inlet of the spring-operated relief valve;
    adjusting the compression of the main spring among a plurality of compression loads;
    using the load cell to measure the compression load of the main spring at a select adjustment of the compression of the main spring;
    identifying a valve-opening movement of the spring-operated relief valve that corresponds to the select adjustment of the compression of the main spring; and
    upon identifying the valve-opening movement, determining a current set pressure or crack pressure based on the measured compression load; and
    one or more of:
        determining a valve lift for the spring-operated relief valve based on the measured force;
        monitoring a current set pressure or crack pressure of the spring-operated relief valve based on the measured force; or
        setting a desired set pressure or crack pressure of the spring-operated relief valve by:
            determining a target load on a main spring of the spring-operated relief valve, the target load corresponding to the desired set pressure or crack pressure; and
            adjusting a bias of the main spring of the spring-operated relief valve until the force measured by the load cell corresponds to the target load.

16. The method of claim 15, further comprising:
    determining a total relieved capacity for a relief event based on a plurality of valve lifts that are identified based on the load cell measuring a plurality of forces applied by the main spring during the relief event.

17. The method of claim 15, wherein the load cell is fixedly secured relative to a valve housing of the spring-operated relief valve at one of:
    outside of the valve housing of the spring-operated relief valve;
    between a pressure adjustment member and an upper spring washer of the spring-operated relief valve; or
    between a bonnet and a cap of the spring-operated relief valve.

* * * * *